United States Patent
Engelbrecht et al.

(10) Patent No.: US 10,336,135 B1
(45) Date of Patent: Jul. 2, 2019

(54) WHEEL ADAPTER FOR A CARGO CONTAINER

(71) Applicants: Frederick W. Anton Engelbrecht, Cape Coral, FL (US); Richard Alan Stahl, Englewood, FL (US); Marshall Roy Crosby, Jonesboro, GA (US)

(72) Inventors: Frederick W. Anton Engelbrecht, Cape Coral, FL (US); Richard Alan Stahl, Englewood, FL (US); Marshall Roy Crosby, Jonesboro, GA (US)

(73) Assignee: SELECTRAILERS LLC, Englewood, FL (US)

(*) Notice: Subject to any disclaimer, the term of this patent is extended or adjusted under 35 U.S.C. 154(b) by 99 days.

(21) Appl. No.: 15/594,037

(22) Filed: May 12, 2017

Related U.S. Application Data

(60) Provisional application No. 62/336,011, filed on May 13, 2016.

(51) Int. Cl.
  *B60B 33/06* (2006.01)
  *B65D 90/18* (2006.01)
  *B60B 33/00* (2006.01)

(52) U.S. Cl.
  CPC .......... *B60B 33/06* (2013.01); *B60B 33/0042* (2013.01); *B60B 33/0049* (2013.01); *B60B 33/0063* (2013.01); *B60B 33/063* (2013.01); *B60B 33/066* (2013.01); *B65D 90/18* (2013.01); *Y10T 16/193* (2015.01); *Y10T 16/1937* (2015.01); *Y10T 16/1943* (2015.01)

(58) Field of Classification Search
  CPC ..... B60B 33/06; B60B 33/063; B60B 33/066; B60B 33/0063; Y10T 16/182; Y10T 16/193; Y10T 16/1937; Y10T 16/1943; B65D 90/18
  USPC .......................................... 16/19, 32, 33, 34
  See application file for complete search history.

(56) References Cited

U.S. PATENT DOCUMENTS

| | | | | |
|---|---|---|---|---|
| 381,120 | A * | 4/1888 | Devoy | B60B 33/06 16/34 |
| 2,002,455 | A * | 5/1935 | Schwerin | B65D 90/18 16/19 |
| 2,803,510 | A * | 8/1957 | Carbary | B60B 33/06 126/304 A |
| 3,656,203 | A * | 4/1972 | Waflart, Jr. | B60B 33/0089 16/35 R |
| 3,691,595 | A | 9/1972 | Backteman et al. | |
| 3,844,578 | A * | 10/1974 | Matyskella | B60B 33/06 16/105 |
| 3,858,270 | A * | 1/1975 | Crowe | B60B 33/06 16/105 |
| 4,105,218 | A * | 8/1978 | Newell | B62B 5/0083 280/43.12 |
| 4,417,738 | A * | 11/1983 | Kendall | B60B 33/06 16/34 |
| 4,452,555 | A * | 6/1984 | Calabro | B60P 1/6445 280/43.23 |

(Continued)

*Primary Examiner* — Jeffrey O'Brien

(57) ABSTRACT

A wheel adapter for a cargo container includes a wheeled adapter body. A container connector on the adapter body is configured for connection to the cargo container. A container elevation bolt threadably engages the adapter body. The container elevation bolt is selectively adjustable to correspondingly adjust an elevation of the adapter body and raise the cargo container for transport.

14 Claims, 17 Drawing Sheets

(56) References Cited

U.S. PATENT DOCUMENTS

| | | | |
|---|---|---|---|
| 4,591,307 A | 5/1986 | Clive-Smith | |
| 4,748,715 A * | 6/1988 | Rice | B60B 33/06 16/19 |
| 4,783,879 A * | 11/1988 | Weaver | B60B 33/04 16/19 |
| 4,998,940 A * | 3/1991 | Norman | B60B 33/06 16/33 |
| 5,044,864 A * | 9/1991 | Stefan | B60B 33/06 254/45 |
| 5,347,680 A * | 9/1994 | Rippe | B60B 33/0042 16/18 R |
| 5,347,682 A * | 9/1994 | Edgerton, Jr. | A61G 7/012 16/32 |
| 5,457,849 A * | 10/1995 | Branson | B60B 33/04 16/19 |
| 5,940,932 A * | 8/1999 | LaHay | B60B 33/06 16/30 |
| 5,971,408 A * | 10/1999 | Mandel | B60B 33/06 248/188.4 |
| 6,601,806 B2 * | 8/2003 | Wing | B60B 1/006 16/19 |
| 6,616,103 B2 * | 9/2003 | Marrero | B64D 1/10 220/1.6 |
| 7,350,269 B2 * | 4/2008 | Dominic | B60B 33/0002 16/19 |
| 7,353,566 B2 * | 4/2008 | Scheiber | B60B 33/04 16/18 R |
| 7,721,395 B2 | 5/2010 | Ding | |
| 8,074,828 B2 | 12/2011 | Hartley et al. | |
| 8,087,126 B2 * | 1/2012 | Duvert | A47D 7/00 16/18 CG |
| 8,109,702 B2 * | 2/2012 | Stegmiller | B64D 9/00 193/35 B |
| 8,136,201 B2 * | 3/2012 | Yantis | A47B 91/022 16/18 R |
| 8,499,414 B1 * | 8/2013 | LeMeur, Jr. | B60B 33/0023 16/19 |
| 9,586,442 B2 * | 3/2017 | Trickle | B60B 33/06 |
| 9,821,603 B2 * | 11/2017 | Trickle | B60B 33/06 |
| 9,849,723 B2 * | 12/2017 | LaFever | B60B 33/066 |
| 2009/0307877 A1 | 12/2009 | Boman et al. | |
| 2010/0038517 A1 * | 2/2010 | Home | B60B 33/0063 248/646 |
| 2011/0155614 A1 | 6/2011 | Szeglin et al. | |
| 2012/0082510 A1 | 4/2012 | Lew | |
| 2016/0281758 A1 | 9/2016 | Dagenais et al. | |
| 2017/0129697 A1 | 5/2017 | Reynard | |

\* cited by examiner

WHEEL ADAPTER FOR A CARGO CONTAINER

CROSS-REFERENCE TO RELATED APPLICATIONS

This application claims the benefit of U.S. Provisional Patent Application Ser. No. 62/336,011, filed on May 13, 2016, which is incorporated by reference herein in its entirety.

FIELD OF THE INVENTION

The present invention relates generally to cargo containers, and more particularly, to a wheel adapter for a cargo container which can be attached to a cargo container to impart a rolling mobility to the cargo container.

BACKGROUND OF THE INVENTION

Shipping containers, also known as cargo containers, are used to load cargo onto and unload the cargo from a ship, truck, train or other means of transportation, and to carry the cargo in an organized and relocatable manner on a means of transportation. For example, intermodal containers are large standardized shipping containers used to transport cargo using different modes of transport without the requirement of unloading and reloading the cargo. ISO containers are an example of intermodal containers.

Conventional cargo containers typically include a floor, walls extending from the floor and a roof on the walls. One or more doors may be provided in the walls of the containers. Containers can also typically include fasteners, or fastening portions to which fasteners can be coupled, to allow securing the containers during loading, unloading and transportation. For instance, ISO containers include eight ISO connectors, one at each corner of the container, for attaching ISO compliant fasteners.

When loaded with cargo, a cargo container may be sufficiently heavy to require machinery for transport. Accordingly, forklifts, cranes or other machinery are commonly used to transport the containers over short distances such as onto and from a means of transportation or among various locations in a storage facility. In some applications, however, forklifts, cranes or other machinery may not be available or may be in limited supply, particularly in the event that a large number of cargo containers require movement over short distances.

Ideally, it would be extremely useful to be able to attach a set of wheels to a container. However, a forklift, crane or other machinery is envisaged as still being necessary to lift the container and allow attaching the set of wheels to the container.

Accordingly, there is an established need for a preferably wheeled device or apparatus that imparts short-range mobility to the cargo container, and yet does not require the use of a crane, forklift or other complex machinery to install or utilize the device.

SUMMARY OF THE INVENTION

The present invention is directed to a wheel adapter for a cargo container which can be attached to a cargo container to impart short-range mobility to the cargo container. The cargo adapter may include a wheeled adapter housing or adapter body. The adapter housing may be configured for attachment to the cargo container. A container elevation bolt may threadably engage the adapter housing. The container elevation bolt may be selectively adjusted to correspondingly adjust the elevation of the adapter housing relative to a wheel axle coupled to the housing, in order to raise the container relative to one or more wheels of the wheeled adapter and provide rolling mobility to the container. Accordingly, in an exemplary application, a respective wheel adapter can be attached to each side of the cargo container. The container elevation bolt of each wheel adapter can be threaded to selectively raise the container and facilitate rolling displacement of the container along a floor or support surface.

In a first implementation of the invention, a wheel adapter for lifting a cargo container and providing rolling mobility to the cargo container comprises an adapter body and a container connector carried by and extending outward from the adapter body. The container connector is configured for connection to a cargo container, such as to an ISO connector of an ISO container. The wheel adapter further includes a container elevation bolt, a wheel support and one or more wheels. The container elevation bolt is threadably engaging the adapter body and comprising a bolt head for the application of a torque on the bolt head to rotate the container elevation bolt. The wheel support is movable relative to the adapter body, and the one or more wheels are coupled to the wheel support and rotatable relative to the adapter body. The wheel adapter can selectively and reversibly adopt a first position, in which the container elevation bolt is threaded away from the wheel support and the wheel support is at a first vertical distance from the container connector, and a second position, in which the wheel support is at a second vertical distance from the container connector which is less than the first distance, and further in which a bottom end of the wheel(s) provides a bottom end of the wheel adapter and can therefore rest on the ground while elevating a container. In the second position, the container elevation bolt is threaded towards the wheel support and pushes the wheel support downward, elevating the container and descending the wheel(s).

In a second aspect, the container connector can be formed along a first central axis arranged in a front-to-back, longitudinal direction. The one or more wheels can be rotatable about a second central axis arranged in a left-to-right, transverse direction. In turn, the container elevation bolt can be arranged along a lateral direction perpendicular to the longitudinal and transverse directions.

In another aspect, the wheel support and the one or more wheels can be suspended from the container elevation bolt when the wheel adapter is in the first position. The one or more wheels can thus be elevated off the ground when the wheel adapter is in the first position.

In another aspect, an end of the container elevation bolt opposed to the bolt head can be received in a bolt receiving portion of the wheel support when the wheel adapter is in the second position.

In another aspect, the container elevation bolt can be rotationally and axially movable within the bolt receiving portion. Axial movement of the container elevation bolt within the bolt receiving portion can be limited.

In another aspect, the bolt receiving portion can be configured to prevent a movement of the container elevation bolt relative to the wheel support in a direction perpendicular to a central axis of the container elevation bolt the when the wheel adapter is in the second position, to maintain alignment between the container elevation bolt and the wheel support.

In another aspect, the wheel adapter can further include a C-clip secured to a cylindrical wall of the bolt receiving portion. The C-clip can be suspended from the container elevation bolt and may carry the wheel support and the one or more wheels when the wheel adapter is in the first position.

In another aspect, the wheel support can include an axle receiving portion and a wheel axle extending through the axle receiving portion.

In another aspect, the bolt receiving portion can extend upward from the axle receiving portion.

In another aspect, the axle receiving portion and the bolt receiving portion can be disposed in an inverted T-shaped arrangement.

In another aspect, the adapter body can include a top wall having a threaded opening. The container elevation bolt can be threaded into and extend through the threaded opening.

In another aspect, the adapter body can include a front wall. The container connector can be affixed to and extend from the front wall.

In another aspect, the one or more wheels can include two wheels arranged on opposite sides of the adapter body.

In another aspect, the wheel support can include a wheel axle extending across the adapter body and carrying the two wheels at opposite ends thereof.

In another aspect, the container connector can be non-movable relative to the adapter body.

In another aspect, the container elevation bolt can rest against the adapter body when the wheel adapter is in the second position, providing a stop to a further threading of the container elevation bolt towards the wheel support.

In another aspect, the bolt head can be located outside the adapter body.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

Figure 1:
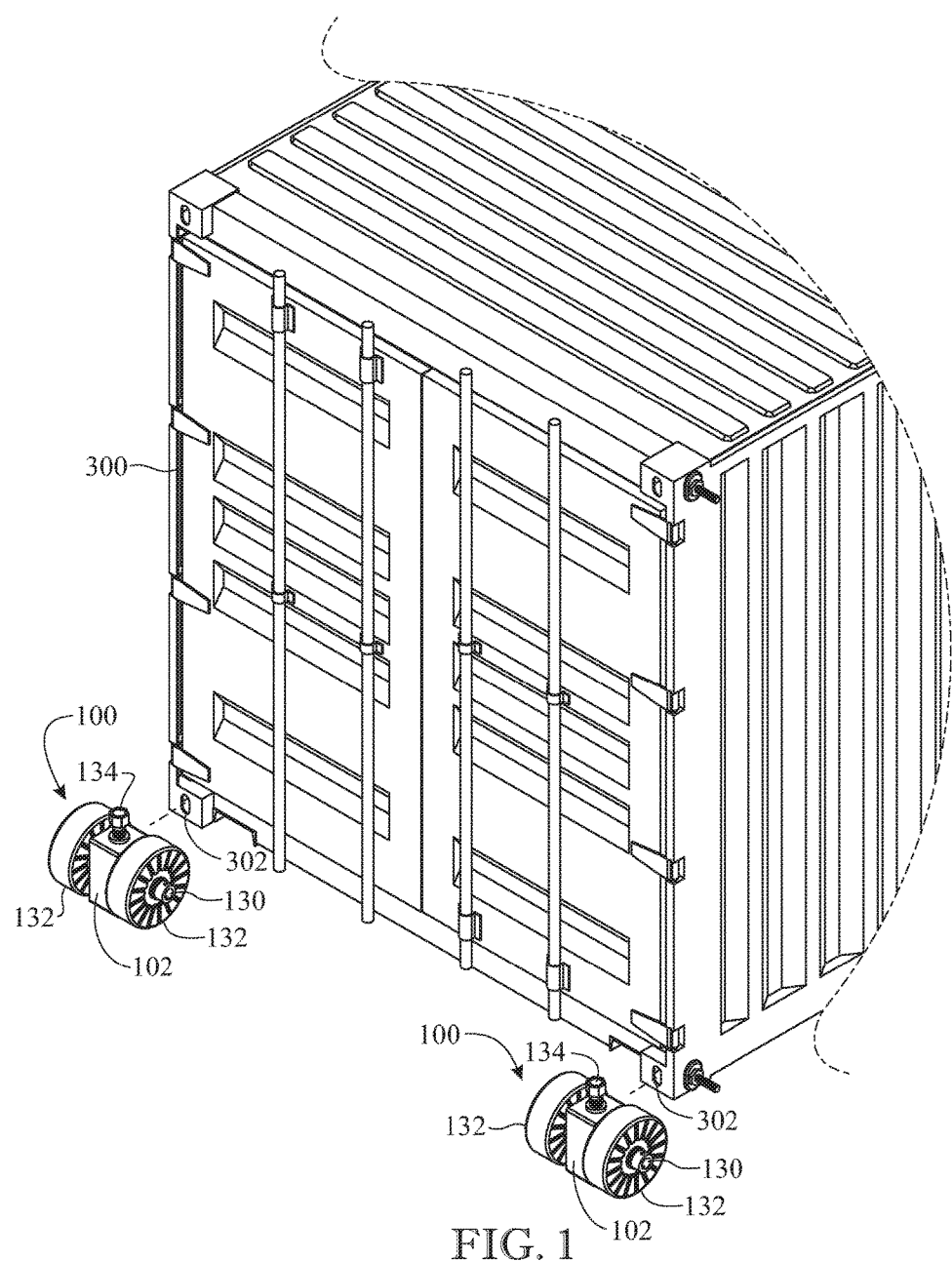
FIG. 1 presents an exploded isometric view of a pair of wheel adapters connected to a respective pair of ISO connectors on an ISO cargo container in accordance with a first illustrative embodiment of the present invention.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present invention is directed toward a wheel adapter which can be attached to a cargo container to impart a rolling mobility to the cargo container.

Referring initially to FIGS. 1-10, a wheeled adapter for a cargo container, hereinafter wheeled adapter 100, is illustrated in accordance with a first exemplary embodiment of the present invention. As shown for instance in FIG. 2, the wheeled adapter 100 includes an adapter body or adapter housing 102. In some embodiments, the adapter housing 102 may include a front wall 104, a rear wall 106, a bottom wall 108, a top wall 110 and a housing interior 112. An interiorly-threaded elevation bolt opening 114 extends through the top wall 110. By interiorly-threaded, it is understood that the bolt opening 114 provides a female threaded connection.

Figure 7:
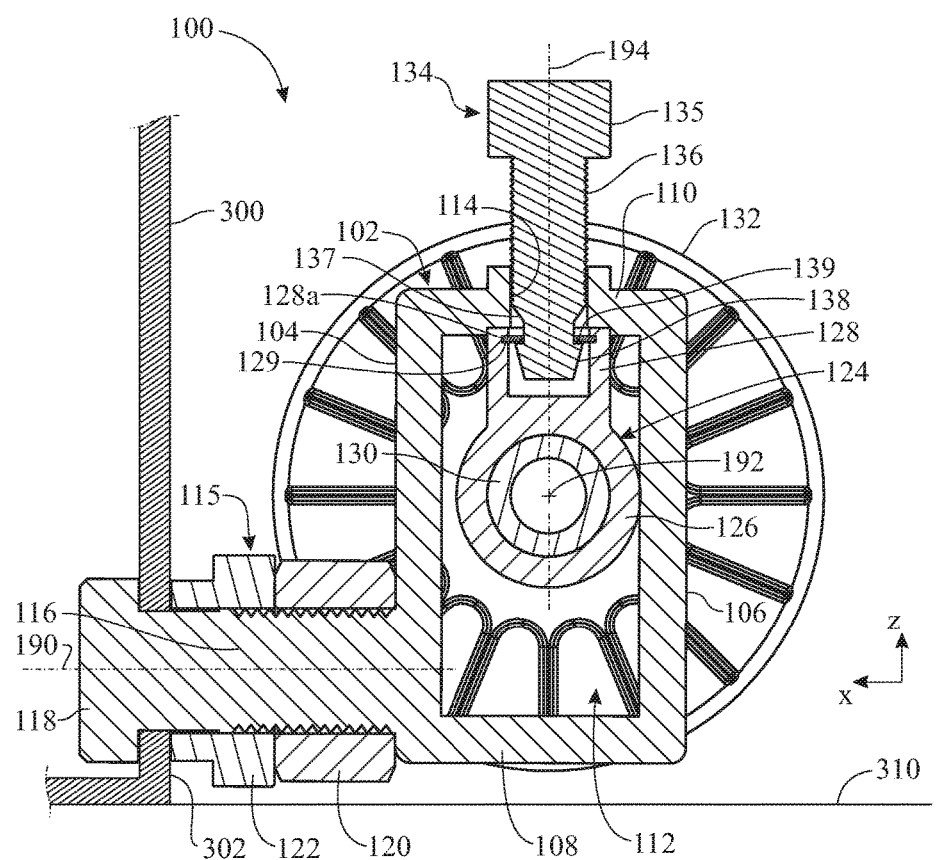
FIG. 7 is a cross-sectional side elevation view of the wheel adapter in the first position of FIG. 5, further illustrating the ISO container.

A container connector 115 may extend from the adapter housing 102 in a front-to-back, longitudinal direction x along a central axis 190 of the container connector 115. The container connector 115 is configured to attach the wheeled adapter 100 to a cargo container; for instance and without limitation, the container connector 115 can be configured for connection to a standard ISO connector 302 on an ISO cargo container 300, shown for example in FIG. 1. As illustrated in FIGS. 2 and 7, in some embodiments, the container connector 115 may include a container coupling bolt 116 and a bolt head 118. The container coupling bolt 116 may extend from the front wall 104 of the adapter housing 102 in a non-movable relationship with the front wall 104 of the adapter housing 102. In some embodiments, as shown in the figures, the container coupling bolt 116 may be integrally formed with the adapter housing 102 into a single-piece unit; in other embodiments, the container coupling bolt 116 may be formed as a separate unit and non-movably attached to the adapter housing 102, such as by welding. A regular nut 120 and a lock nut 122 may be threaded on the container coupling bolt 116. The regular nut 120 and the lock nut 122 facilitate coupling of the container coupling bolt 116, and thus the adapter housing 102, to the cargo container 300.

Figure 2:
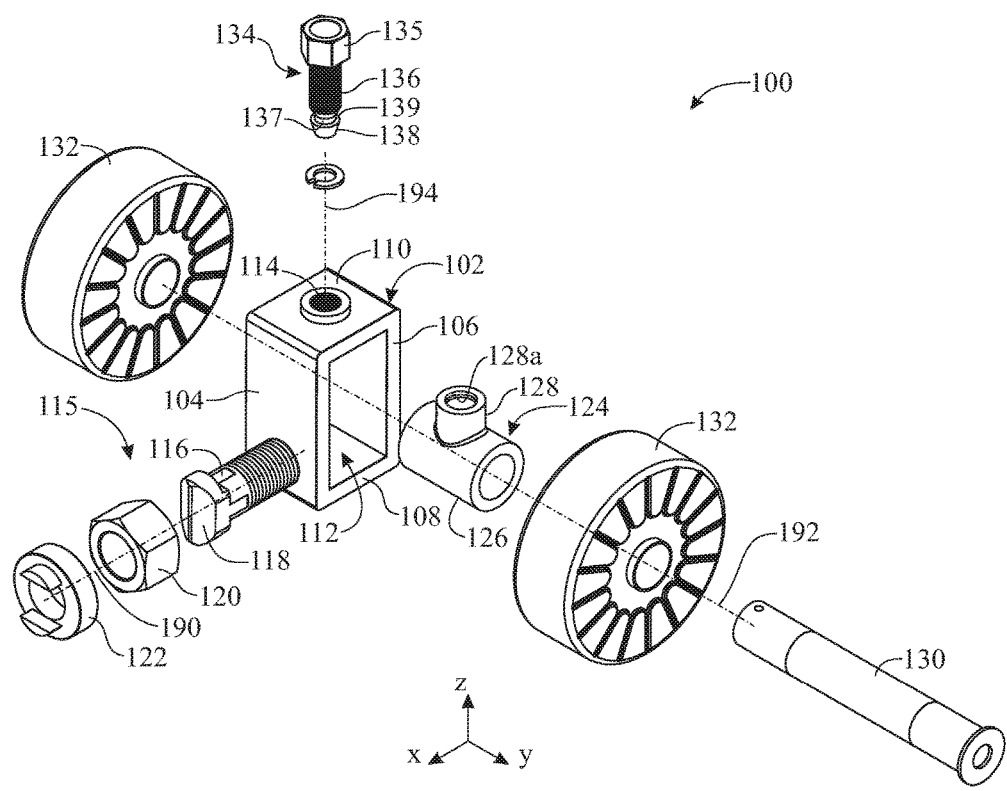
FIG. 2 presents an exploded isometric view of one of the wheel adapters illustrated in FIG. 1.
Figure 3:
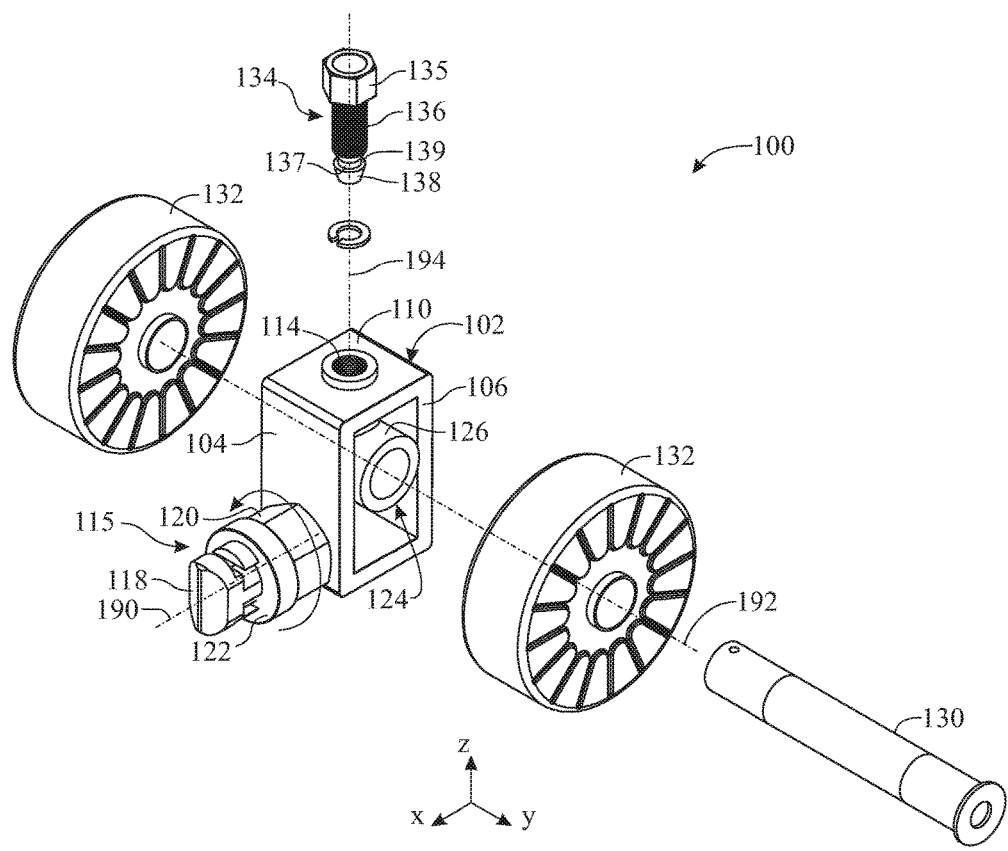
FIG. 3 presents an exploded isometric view of the wheel adapter illustrated in FIG. 2, with the container connector in an assembled configuration.
Figure 4:
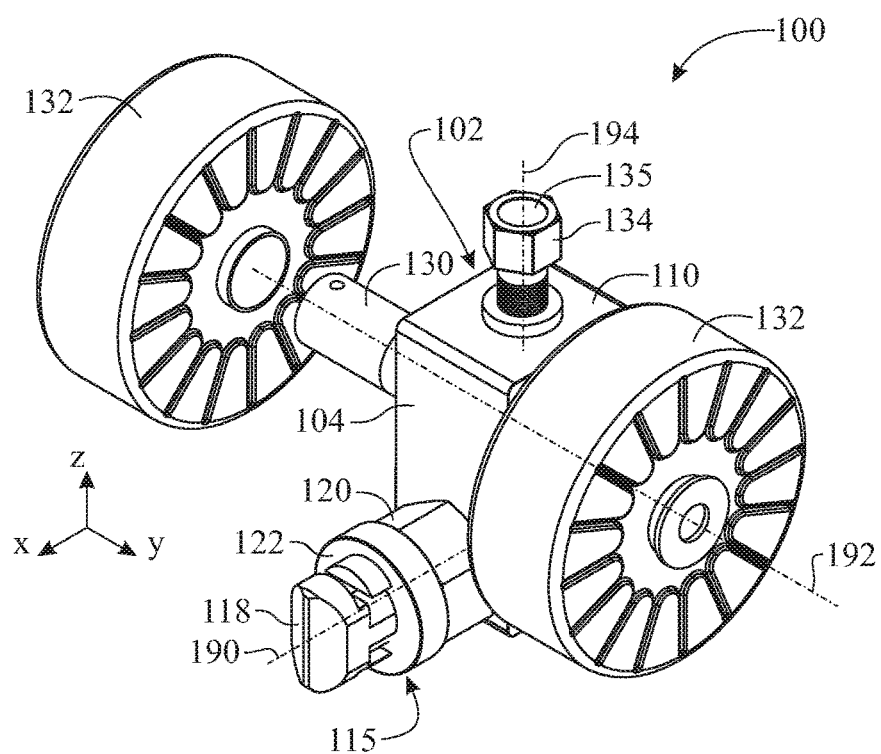
FIG. 4 presents an isometric view of the partially-assembled wheel adapter, more particularly illustrating typical attachment of a wheel to the wheel axle.

A wheel axle 130 may be formed along a central axis 102 and extend through the adapter housing 102. The wheel axle 130 and central axis 192 are arranged preferably in a left-to-right, transverse direction y which is perpendicular to the longitudinal direction x. A pair of wheels 132 may be provided on the wheel axle 130. The wheel axle 130 may be mounted in the adapter housing 102. As illustrated in FIGS. 2 and 3, in some embodiments, an axle coupling 124 may be disposed in the housing interior 112 of the adapter housing 102. The axle coupling 124 may be generally T-shaped with an axle receiving portion 126 extending along the transverse direction transverse direction y and about the same central axis 192 as the wheel axle 130, and an interiorly-non-threaded, cylindrical bolt receiving portion 128 which can extend upward from a central portion of the axle receiving portion 126 along a central axis 194 which is preferably arranged in a lateral direction z perpendicular to the longitudinal and transverse directions x and y. A C-clip 129 is non-movably secured to the bolt receiving portion 128 (fitted into a recess 128a provided in an inner wall of the bolt receiving portion 128) for purposes that will be described hereinafter. The axle receiving portion 126 is shaped and sized to receive the wheel axle 130 therethrough. The axle receiving portion 126 and wheel axle 130 jointly provide a wheel support, for rotatably supporting the wheels 132. The wheels 132 are configured to rotate freely in relation to the housing 102; for instance and without limitation, the wheels 132 can be rotatably coupled to the wheel axle 130 or the wheel axle 130 can be rotatably coupled to the axle receiving portion 126 by ball bearings or other suitable techniques known by those skilled in the art. When the wheel adapter 100 is assembled, the wheel axle 130 extends through the axle receiving portion 126, and the bolt receiving portion 128 aligns or registers with the elevation bolt opening 114 for purposes which will be hereinafter described.

Figure 8:
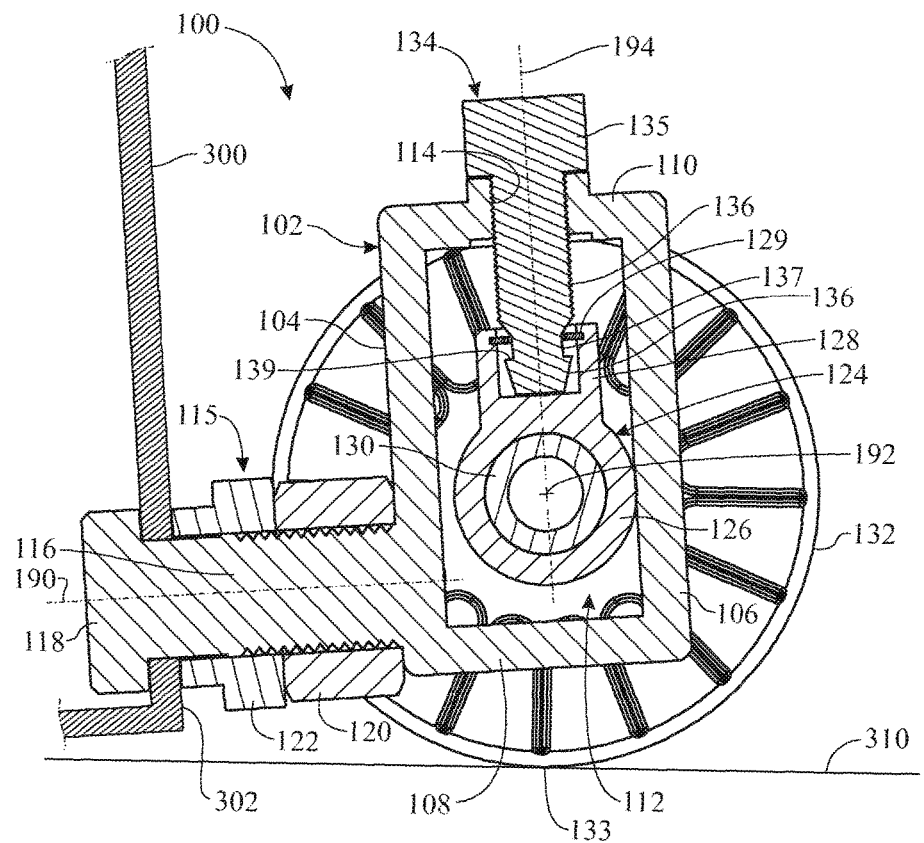
FIG. 8 is a cross-sectional side elevation view of the wheel adapter in the second position of FIG. 6, further illustrating the ISO container.

As particularly illustrated in FIGS. 7 and 8, a container elevation bolt 134 may be threaded to the elevation bolt opening 114, into the adapter housing 102 and inserted into the bolt receiving portion 128 of the axle coupling 124. The container elevation bolt 134 includes a bolt head 135 preferably arranged outside the adapter body 102 to facilitate the coupling of a torque-applying tool or device (not shown) onto the bolt head 135. The container elevation bolt 134 further includes a threaded shaft 136, a partially-conical and partially-cylindrical neck portion 137 which is narrower than and extends from the threaded shaft 136, and a conical end portion 138 which extends from and end of the neck portion 137 and is wider than said end of the neck portion 137 and preferably narrower than the threaded shaft 136. A stop surface 189 of the end portion 138 extends radially from said end of the neck portion 137, as best shown in FIGS. 2 and 7. The container elevation bolt 134 is movably received in the bolt receiving portion 128, and is able to move within the bolt receiving portion 128 both axially (along central axis 194) and rotationally (about central axis 194). The axial movement of the container elevation bolt 134 relative to the bolt receiving portion 128 is limited by the C-clip 129.

Figure 5:
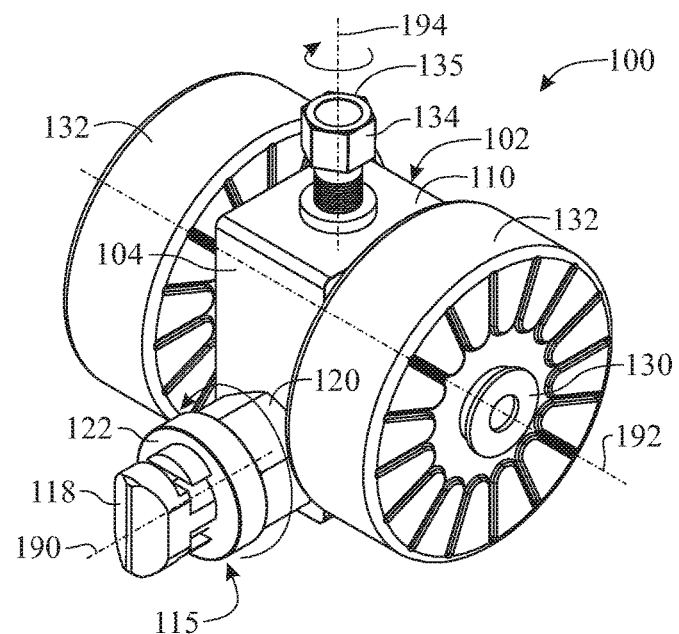
FIG. 5 presents an isometric view of the wheel adapter in a first position, in which the wheels are elevated relative to the adapter housing, more particularly illustrating rotation of the container elevation bolt to elevate the adapter housing.
Figure 6:
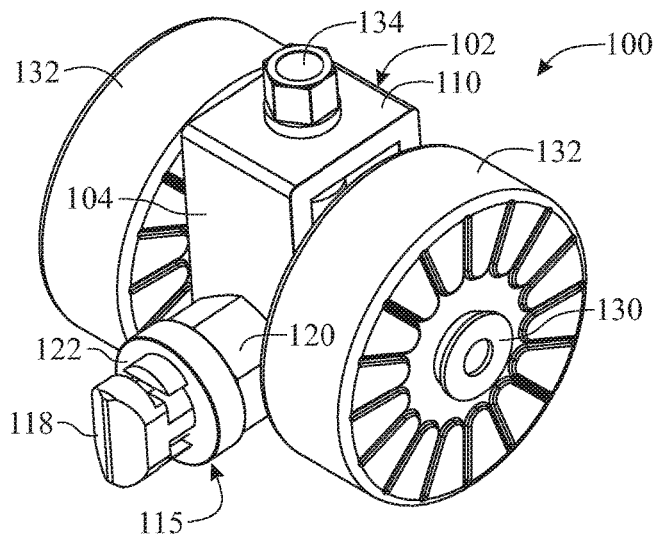
FIG. 6 presents an isometric view of the wheel adapter in a second position, in which the wheels are lowered relative to the adapter housing.

In some embodiments, as shown in FIG. 7, a central longitudinal axis of the container elevation bolt 134 (arranged in the lateral direction z) may be vertically aligned with a central longitudinal axis of the wheel axle 130 (arranged in the transverse direction y). The axle coupling 124 is movable laterally (i.e. in the lateral direction z) within and in relation to the adapter housing 102. As will be described in greater detail hereinafter, by adjusting the degree of threading and insertion of the container elevation bolt 134 into the elevation bolt opening 114 of the adapter housing 102, the lateral position of the axle coupling 124 relative to the adapter housing 102 and container connector 115 is adjusted, thereby adjusting the vertical position of the wheel axle 130 relative to the adapter housing 102 and container connector 115. For instance, the axle coupling 124 and wheel axle 130 can be selectively deployed in a first or elevated position relative to the container connector 115, as illustrated in FIGS. 5 and 7, typically by counterclockwise threading of the container elevation bolt 134 in the elevation bolt opening 114 of the adapter housing 102; accordingly, the housing 102 and container connector 115 are deployed in a lowered position relative to the axle coupling 124 and wheel axle 130. Alternatively, the axle coupling 124 and wheel axle 130 can be selectively deployed in a second or lowered position relative to the container connector 115, as illustrated in FIGS. 6 and 8, typically by clockwise threading of the container elevation bolt 134 in the elevation bolt opening 114 of the adapter housing 102; accordingly, the housing 102 and container connector 115 are deployed in an elevated position relative to the axle coupling 124 and wheel axle 130, and the wheel 132 is in a lowered position in which a bottom end of the wheel provides a bottom end of the wheel adapter 100. Although not shown, intermediate positions are possible, by only partially threading the container elevation bolt 134 into the adapter housing 102.

As illustrated in FIGS. 1 and 7-10, in typical application, two or more wheel adapters 100 are attached to a cargo container 300 to facilitate rolling mobility of the cargo container 300 on a support surface 310. The cargo container 300 may be a standard shipping container known in the art including but not limited to a standard ISO shipping container, as shown in the drawings. As best shown in FIG. 1, a standard ISO connector 302 is provided on each of the six corners of the standard ISO cargo container 300 as known in the art. In some applications, four wheel adapters 100 in accordance with the invention can be respectively attached to the four bottom corners of the cargo container 300; in other applications, such as that of FIG. 1, only two wheel adapters 100 can be connected to two opposed bottom ISO connectors 302 of the cargo container 300. The container connector 115 of each wheel adapter 100 couples with the companion ISO connector 302 to facilitate attachment of the wheel adapters 100 to the cargo container 300. Standard ISO connectors 302 are highly resistant to cargo weight and pulling and pushing forces on the cargo container 300. Therefore, because the wheel adapter 100 typically connects to the standard ISO connector 302 on the cargo container 300, the connection between the wheel adapter 100 and the cargo container 300 is particularly robust.

Figure 9:
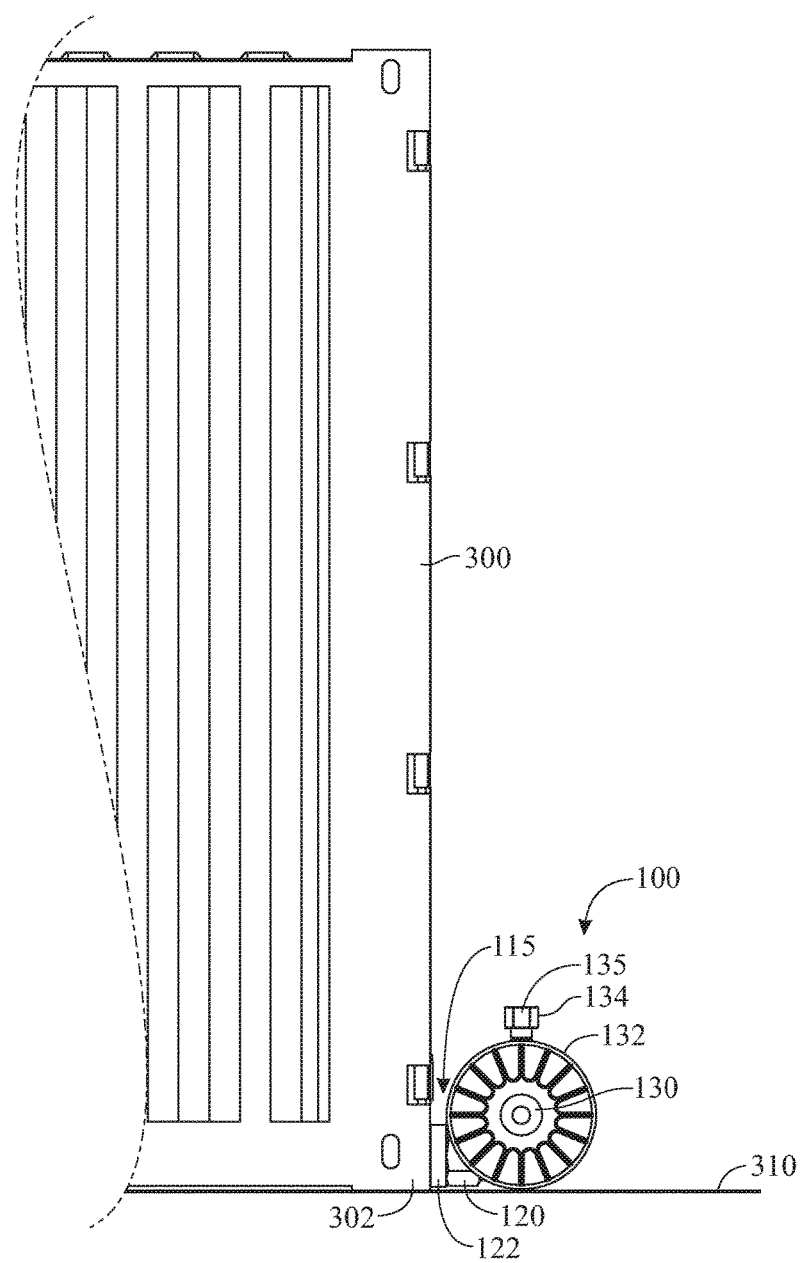
FIG. 9 is a side elevation view of the wheel adapter on the cargo container (shown only partially), with the wheel adapter in the first position of FIG. 5.

As illustrated in FIGS. 7 and 9, each wheel adapter 100 may initially be deployed in a first position with the cargo container 300 resting on the support surface 310. In this first position, the container elevation bolt 134 has been threaded in the counterclockwise direction relative to the elevation bolt opening 114 of the adapter housing 102, as illustrated in FIGS. 5 and 7, and threaded out of the adapter housing 102 in an upward direction. During the unthreading and rising of the container elevation bolt 134, the stop surface 139 of the end portion 138 of the container elevation bolt 134 has risen and contacted C-clip 129 and exerted an upward traction force on the C-clip 129, causing the C-clip 129, axle coupling 124, wheel axle 130 and wheels 132 to jointly rise, suspended from the container elevation bolt 134. In the first position of FIGS. 5 and 7, the container elevation bolt 134 is sufficiently unthreaded from the adapter housing 102 to position the wheels 132 in an elevated position relative to the support surface 310.

Figure 10:
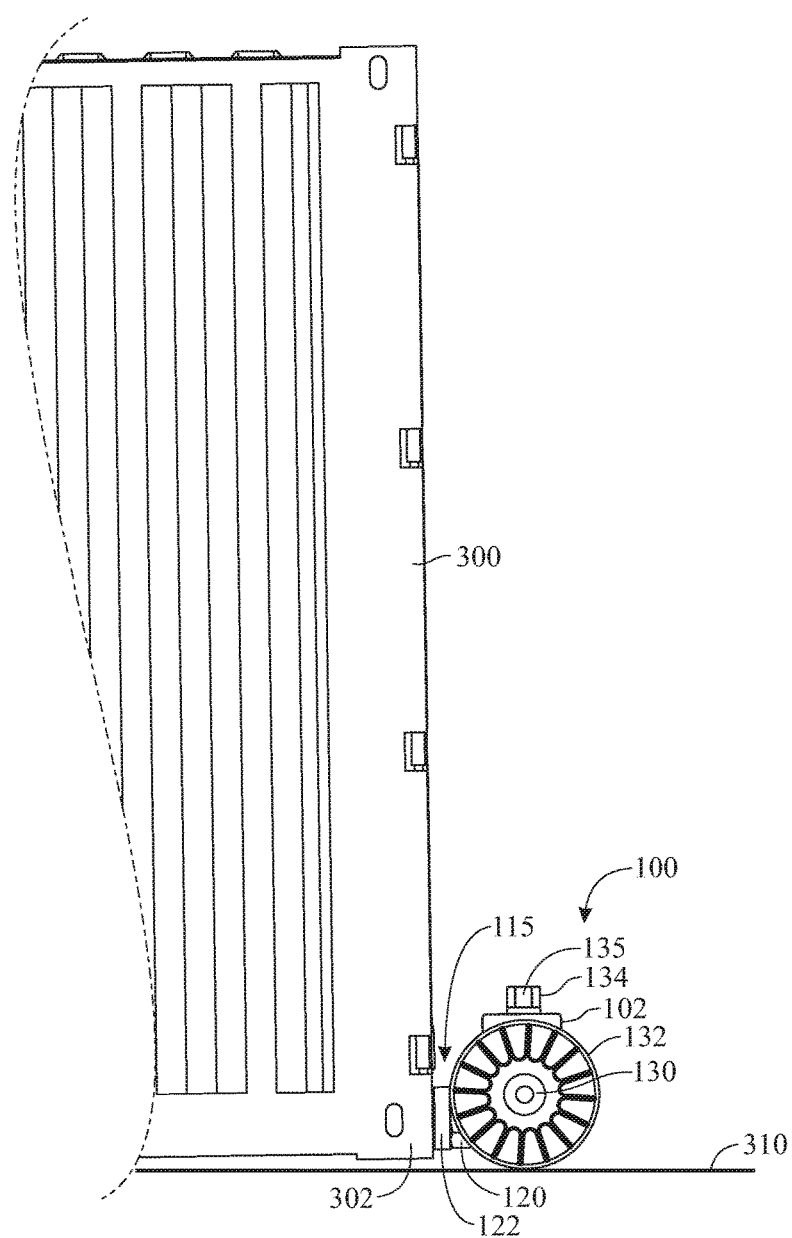
FIG. 10 is a side elevation view of the wheel adapter on the cargo container, with the wheel adapter in the second position of FIG. 6.
Figure 11:
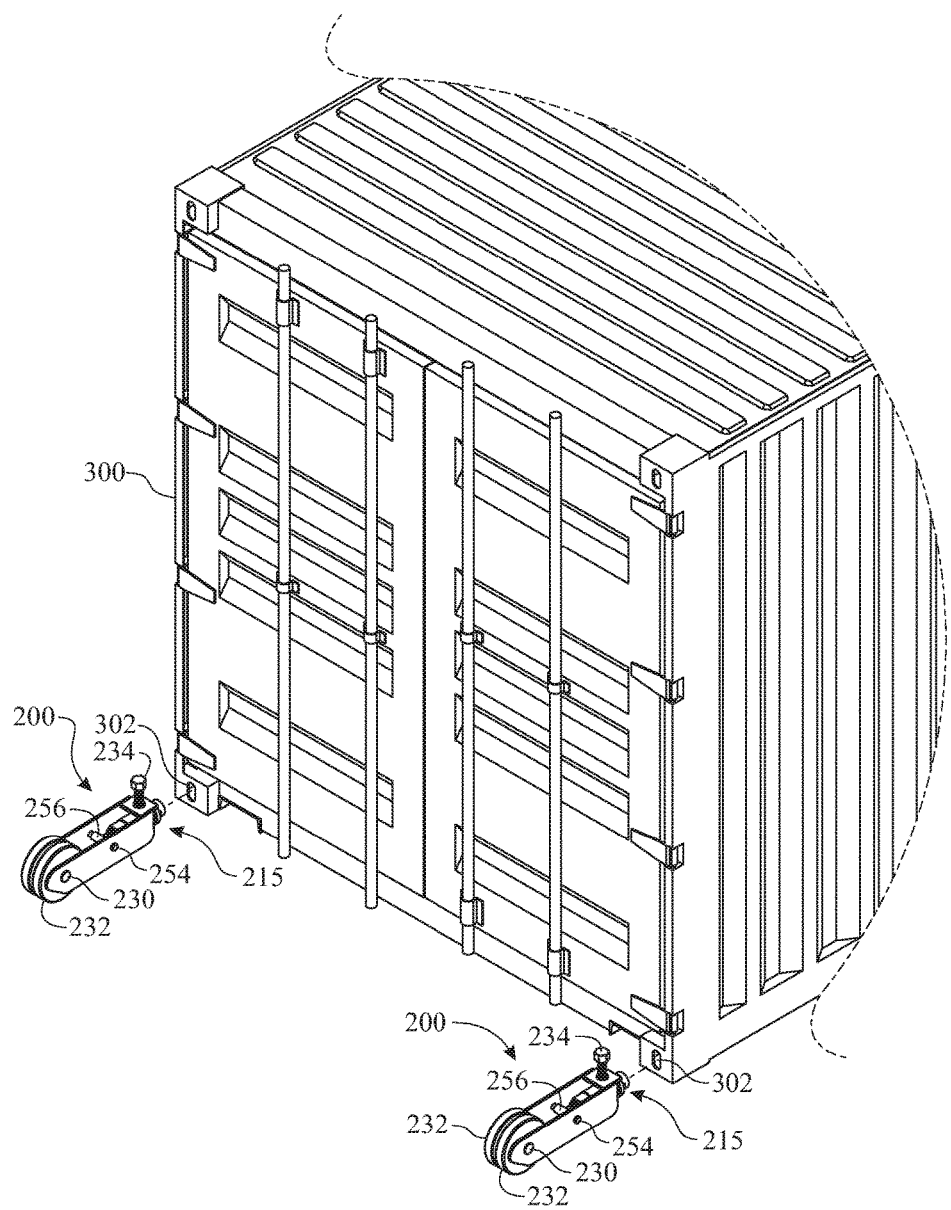
FIG. 11 is an exploded isometric view of a pair of wheel adapters connected to a respective pair of ISO connectors on an ISO cargo container in accordance with a second illustrative embodiment of the present invention.

From this first position, a torque may start to be applied on the bolt head 135 of the container elevation bolt 134 in the clockwise direction to thread the container elevation bolt 134 into the elevation bolt opening 114 of the adapter housing 102. Threading the container elevation bolt 134 into the adapter housing 102 causes the container elevation bolt 134 and the components that are suspended from the container elevation bolt 134 (i.e. the C-clip 129, axle coupling 124, wheel axle 130 and wheels 132) to jointly descend, eventually causing the wheels 132 to reach the support surface 310. Once the wheels 132 have contacted the support surface 310, this contact prevents the wheels 132, wheel axle 130, axle coupling 124 and container elevation bolt 134 from moving further downwards; thus, further continued threading of the container elevation bolt 134 into the adapter housing 102 causes the elevation bolt opening 114 (and thus the adapter housing 102) to displace upward with respect to the container elevation bolt 134 as the container elevation bolt 134 rotates but no longer moves axially downward. In consequence, the container connector 115 (which is affixed to the adapter housing 102) and the cargo container 300 (which is attached to the container connector 115) are caused to jointly move upward relative to the wheels 132, wheel axle 130, axle coupling 124 and container elevation bolt 134, lifting the cargo container 300 off the support surface 310. The illustrations of FIGS. 8 and 10 show the wheel adapter 100 in a second position, in which the container elevation bolt 134 has been threaded as deeply as possible into the adapter housing 102 and the bolt head 135 rests against the adapter housing 102, and the cargo container 300 significantly lifted from the support surface 310. In this second position, a bottom end of the container elevation bolt 134 opposite the bolt head 135 is received in the bolt receiving portion 128, ensuring that the container elevation bolt 134 remains in correct alignment with the axle coupling 124 and wheel axle 130 regardless of longitudinal or transverse forces which may be exerted on the container elevation bolt 134 or other components of the wheel adapter 100; more specifically, when aligned, the central axis 194 of the container elevation bolt 134 is preferably coplanar to the central axis 192 of the wheel axle 130. Furthermore, in this second position, the bottom end 133 of the wheel 132 rests on the support surface 310. This lifting sequence can be repeated on a wheel adapter 100 affixed to an opposite corner of the cargo container 300. The raised cargo container 300 can be transported on the support surface 310 typically by lifting an opposite end of the cargo container 300 and pulling or pushing the cargo container 300 as the two wheels 132 roll on the support surface 310. Alternatively, the lifting sequence can be repeated on wheel adapters 100 provided on all four bottom corners of the cargo container 300, to completely lift the cargo container 300 to become supported on four wheels 132 and allow the cargo container 300 to be displaced by pulling or pushing the cargo container 300 as the four wheels 132 roll on the support surface 310. In this manner, the cargo container 300 can be easily moved, such as from a cargo storage area onto a transport vehicle, from the transport vehicle to the cargo storage area or from one place to another within a lot.

After the cargo container 300 has arrived at the intended destination, the wheel adapters 100 can again be deployed in to the first position of FIGS. 5, 7 and 9 typically by counterclockwise rotation of the head 135 of the container elevation bolt 134 relative to the adapter housing 102 and the axle coupling 124 of each corresponding wheel adapter 100. This action lowers the cargo container 300 back onto the support surface 310, as illustrated in FIG. 9. In some applications, the wheel adapters 100 can be detached from the cargo container 300 by uncoupling the container connectors 115 on the respective wheel adapters 100 from the respective ISO connectors 302 (FIG. 1) on the cargo container 300. Alternatively, in some applications, the wheel adapters 100 may remain in place on the cargo container 300 in anticipation of further transport requirements.

In summary, a cargo container wheel adapter 100 is provided which can elevate a cargo container 300 and provide a wheeled support by simply operating a container elevation bolt 134. In dependence of the degree to which the container elevation bolt 134 is threaded into the adapter housing 102 (i.e. the elevation bolt opening 114), the vertical position of the adapter housing 102 in relation to the wheels 132 can be adjusted. Thus, by adjusting the container elevation bolt 134, the cargo container 300 can be lifted from or lowered onto a support surface 310, and can be supported or not on the wheels 132.

Figure 12:
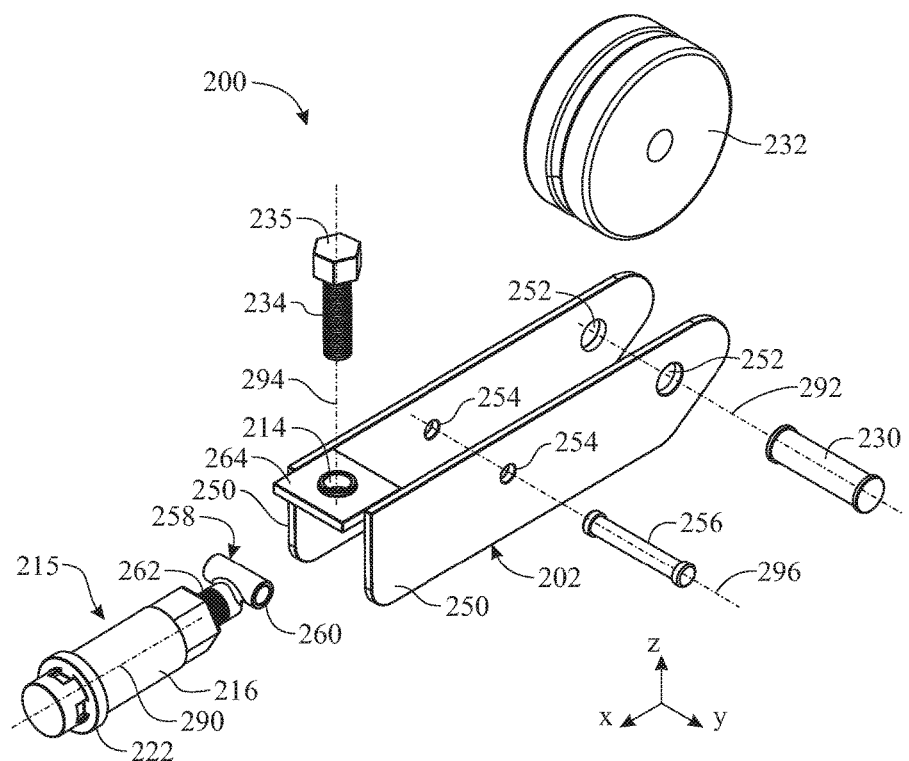
FIG. 12 is an exploded isometric view of one of the wheel adapters illustrated in FIG. 11.
Figure 13:
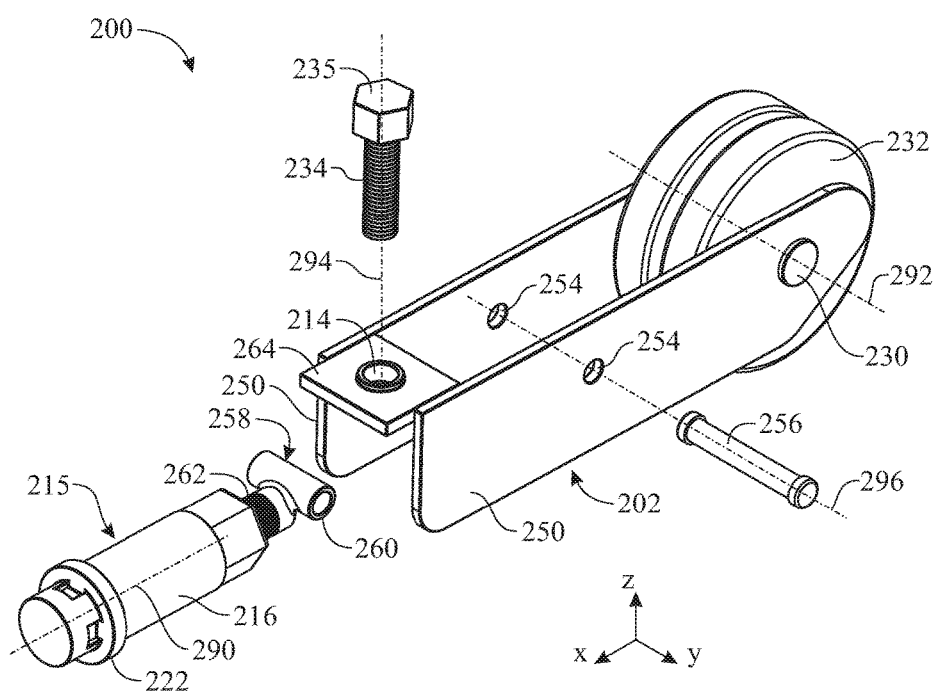
FIG. 13 is a partially-exploded isometric view of the wheel adapter illustrated in FIG. 12, with the container connector in exploded view and the wheel assembled.
Figure 14:
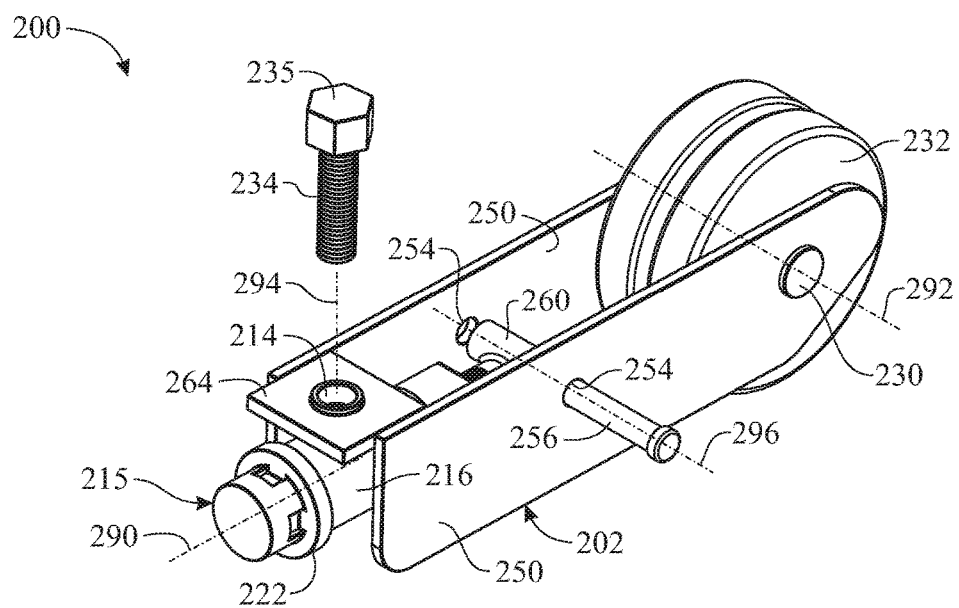
FIG. 14 is a partially-exploded isometric view of the wheel adapter illustrated in FIG. 12, more particularly illustrating typical engagement of the container elevation bolt with the adapter housing.

Referring next to FIGS. 11-20, a wheeled adapter 200 is shown in accordance with a second illustrative embodiment of the invention. Reference numerals which correspond to like elements of the wheeled adapter 100 heretofore described with respect to FIGS. 1-10 are designated by the same reference numerals in the 200-299 series in FIGS. 11-20. As illustrated in FIG. 12, the adapter body or adapter housing 202 of the wheeled adapter 200 may include a pair of generally elongated, parallel, spaced-apart side plates 250 arranged in a front-to-back, longitudinal direction x, and a connecting plate 264 extending between the side plates 250 at a front end of the adapter housing 202. An elevation bolt opening 214 may extend through the connecting plate 264. A container elevation bolt 234, formed along a central axis 294, threadably engages the elevation bolt opening 214 and is threadingly movable along a lateral direction z perpendicular to the longitudinal direction x.

A pair of wheel axle openings 252 may extend through the side plates 250 at a rear end of the adapter housing 202. The wheel axle openings 252 are aligned or in registration with one another along a left-to-right, transverse direction y perpendicular to the longitudinal and lateral directions x and z. A wheel axle 230, formed along a central axis 292, may extend through the wheel axle openings 252 and in the transverse direction y. A wheel 232 may be mounted for rotation on the wheel axle 230 between the side plates 250 of the adapter housing 202.

A container connector 215, formed along a central axis 290, is pivotally connected to the adapter housing 202 and protrudes from the front end of the adapter housing 202. The container connector 215 is pivotally mounted between the side plates 250 of the adapter housing 202. For instance and without limitation, as illustrated in FIG. 12, in some embodiments, a pin coupling 258 may terminate the container coupling bolt 216 inside the adapter housing 202. The pin coupling 258 may include a neck 262 attached to or integrally formed with the container coupling bolt 216, and a transverse, preferably cylindrical pin receiving portion 260 which terminates the neck 262. A pair of aligned or registering pin openings 254 may extend through the side plates 250 at a point which is longitudinally between the elevation bolt opening 214 in the connecting plate 264 and the wheel axle openings 252. A pivot pin 256, formed along a central axis 296, may extend in the transverse direction y through the pin openings 254 and through the registering pin receiving portion 260 to pivotally mount the container connector 215 between the side plates 250 for purposes which will be hereinafter described.

Figure 17:
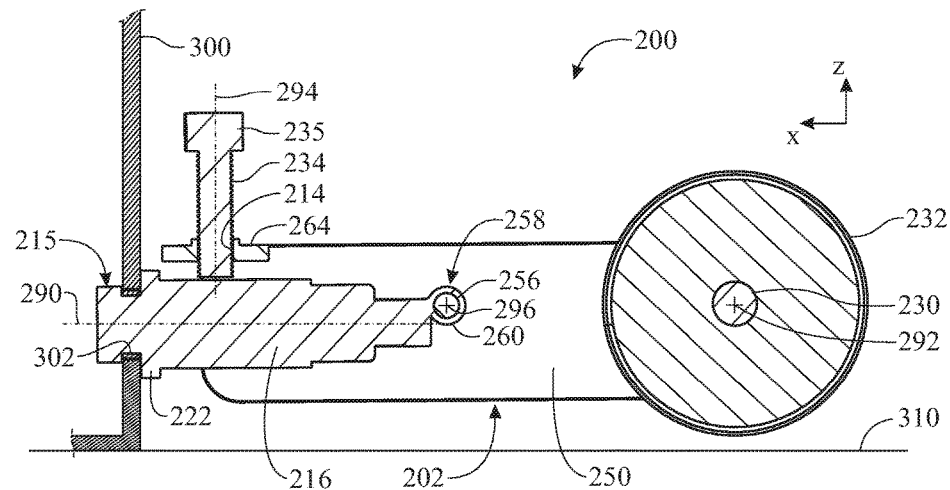
FIG. 17 is a cross-sectional side elevation view of the wheel adapter in the first position of FIG. 15, further illustrating the ISO container.
Figure 18:
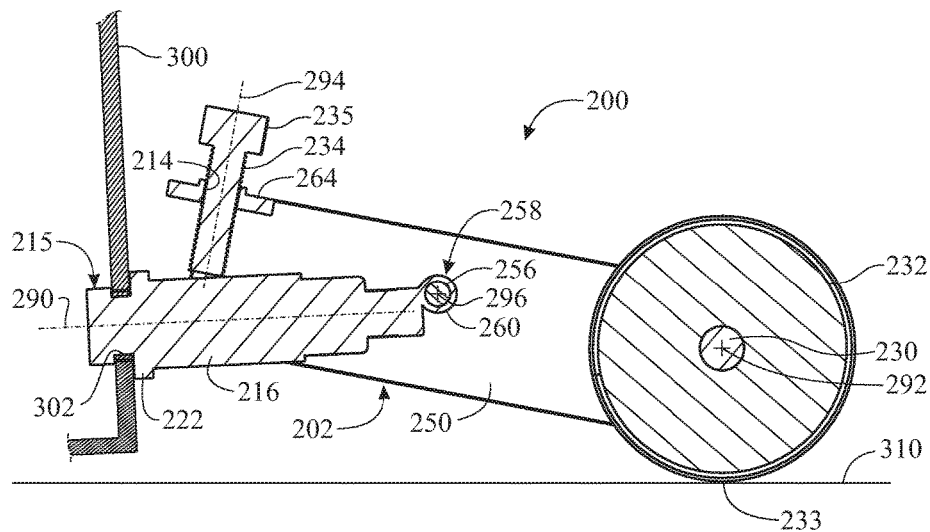
FIG. 18 is a cross-sectional side elevation view of the wheel adapter in the second position of FIG. 16, further illustrating the ISO container.

As particularly illustrated in FIGS. 17 and 18, the container elevation bolt 234 may abut against the container connector 215. More specifically, the container elevation bolt 234 may be threaded through the elevation bolt opening 214 in the connecting plate 264 of the adapter housing 202 and into engagement with the container coupling bolt 216 of the container connector 215. In the present embodiment, as shown in FIG. 17, the central axis 294 of the container elevation bolt 234 is longitudinally spaced-apart with respect to the central axis 292 of the wheel axle 230, with the central axis 294 arranged frontward of the central axis 292. In turn, the central axis 296 of the pivot pin 256 is arranged longitudinally rearward of the central axis 294 of the container elevation bolt 234 and frontward of the central axis 292 of the wheel axle 230. Thus, the pivot pin 256 forms an intermediate pivoting axis between the front and rear ends of the adapter housing 202.

Figure 15:
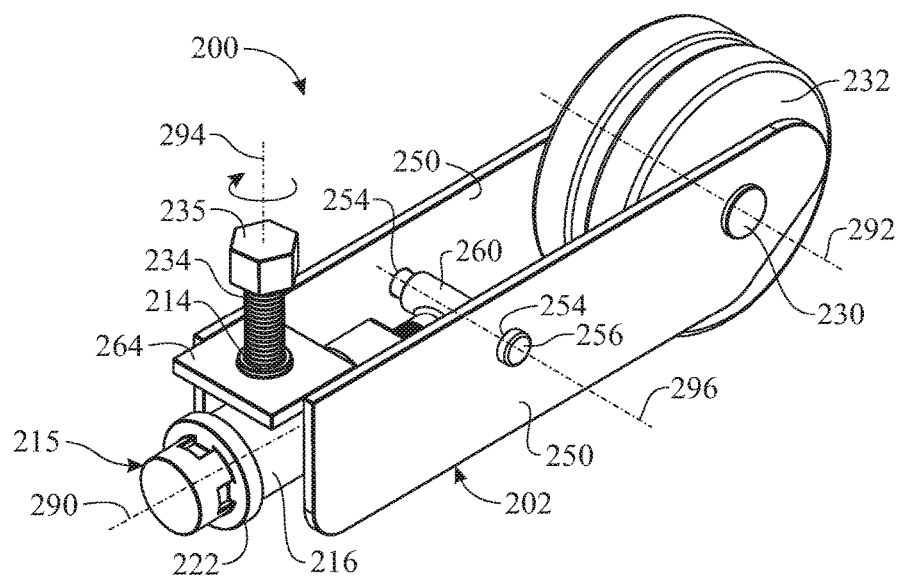
FIG. 15 is an isometric view of the wheel adapter of FIG. 12 in a first position, in which the wheel is elevated relative to the container connector, more particularly illustrating rotation of the container elevation bolt to elevate the adapter housing.
Figure 16:
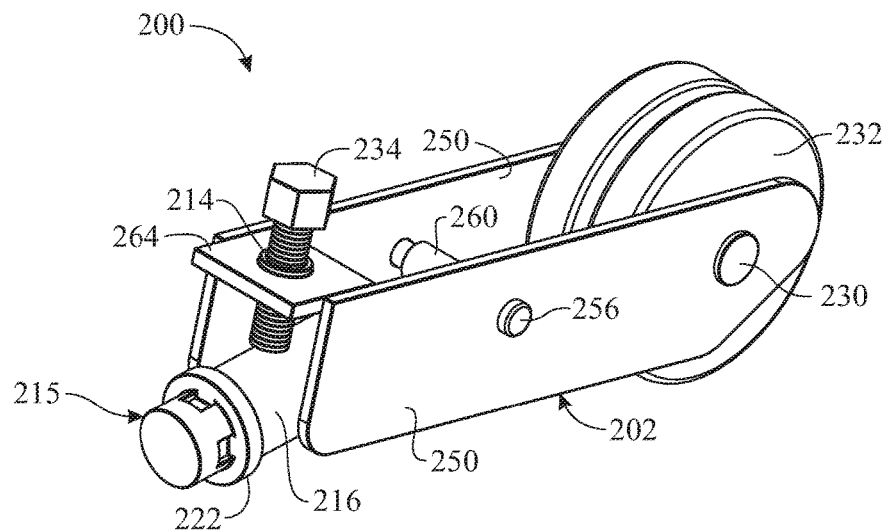
FIG. 16 presents an isometric view of the wheel adapter of FIG. 12 in a second position, in which the wheel is lowered relative to the container connector.

The wheel adapter 200 can be selectively deployed in the lowered position, as illustrated in FIGS. 15 and 17, typically by applying a torque on a head 235 of the container elevation bolt 234 to cause a counterclockwise threading of the container elevation bolt 234 outward of the elevation bolt opening 214. This action lowers the front end of the adapter housing 202 as the adapter housing 202 pivots relative to the container coupling bolt 216 about the central axis 296 of the pivot pin 256. Alternatively, the wheel adapter 200 can be selectively deployed in the raised position, as illustrated in FIGS. 16 and 18, typically by applying a torque on a head 235 of the container elevation bolt 234 to cause a clockwise threading of the container elevation bolt 234 into the elevation bolt opening 214 and against the container coupling bolt 216 of the container connector 215. This action raises the front end of the adapter housing 202 as the adapter housing 202 pivots relative to the container coupling bolt 216 about the central axis 296 of the pivot pin 256. In this raised position, a bottom end 233 of the wheel 232 provides a bottom end of the wheel adapter 200.

Figure 19:
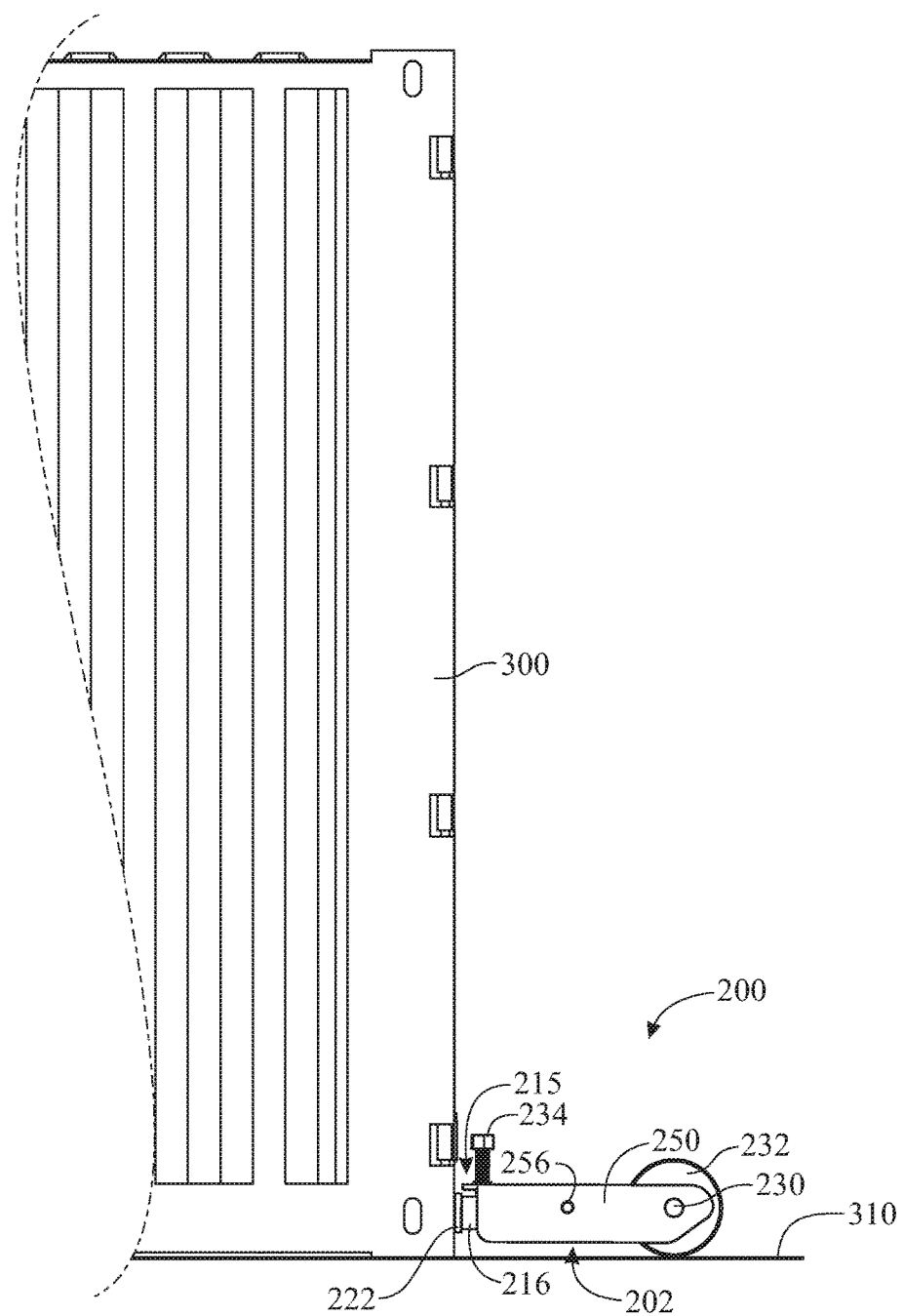
FIG. 19 is a side elevation view of the wheel adapter of FIG. 12 on the cargo container (shown only partially), with the wheel adapter in the first position of FIG. 15.
Figure 20:
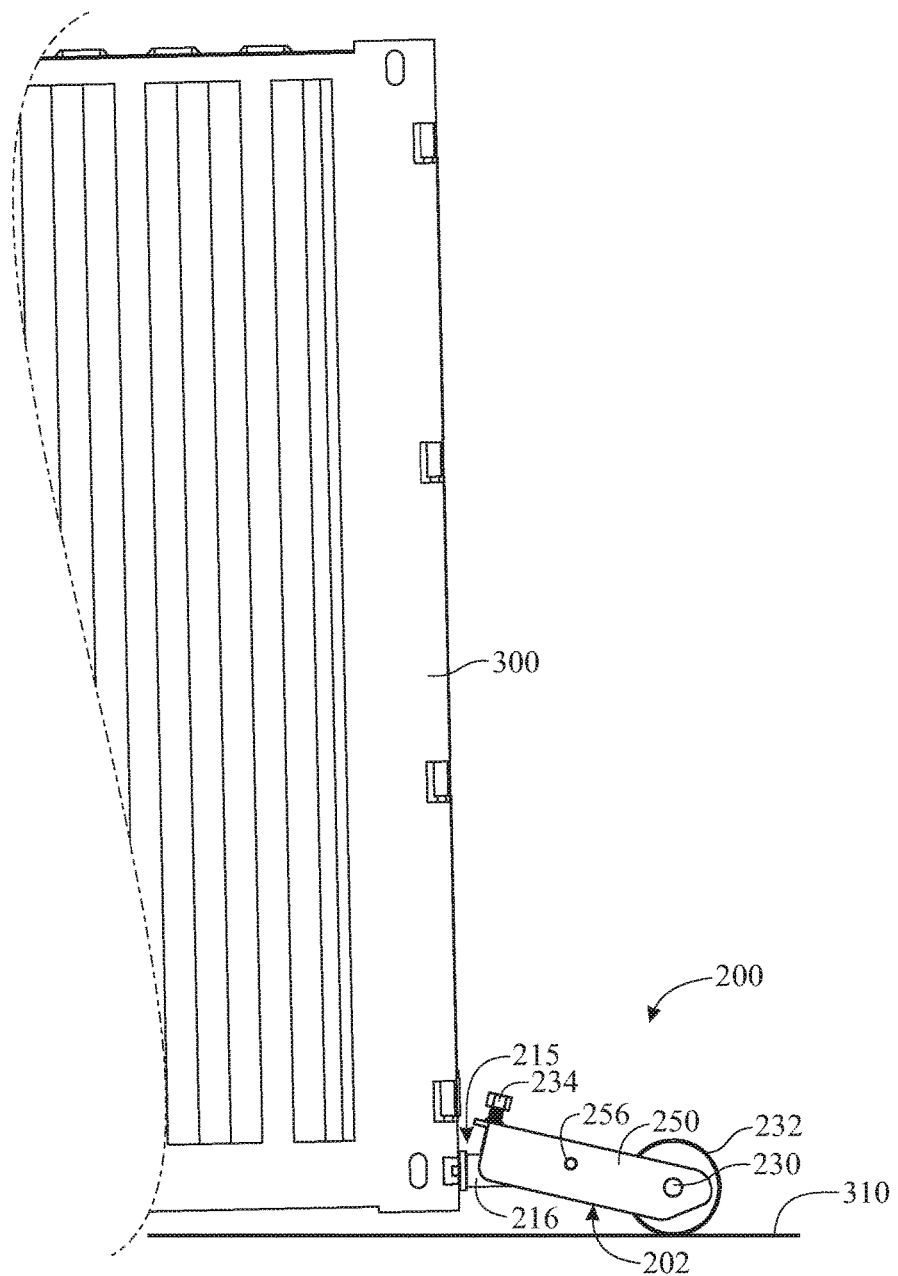
FIG. 20 is a side elevation view of the wheel adapter of FIG. 12 on the cargo container, with the wheel adapter in the second position of FIG. 16.

Application of the wheel adapter 200 may be as was heretofore described with respect to the wheel adapter 100 of FIGS. 1-10. As illustrated in FIGS. 11 and 17-20, in typical application, two or more wheel adapters 200 are attached to the cargo container 300. As illustrated in FIG. 19, each wheel adapter 200 may initially be deployed in the lowered position with the cargo container 300 resting on the support surface 310. The container elevation bolt 234 may then be threaded in the clockwise direction into the elevation bolt opening 214 and against the container coupling bolt 216 of the container connector 215, as illustrated in FIGS. 16 and 18, to raise the adapter housing 202 relative to the wheel axle 130 and lift the cargo container 300 from the support surface 310, as illustrated in FIG. 20 while the bottom end 233 of the wheel 232 rests on the support surface 230, thus facilitating transport of the cargo container 300 over the support surface 310.

After the cargo container 300 has arrived at the intended destination, the wheel adapters 200 can again be deployed in the lowered position typically by clockwise rotation of the container elevation bolt 234 in the adapter housing 202 of each corresponding wheel adapter 200 to lower the cargo container 300 back onto the support surface 310, as illustrated in FIG. 19. The wheel adapters 200 can be detached from the cargo container 300 or remain in place on the cargo container 300 in anticipation of further short-range transport requirements.

Alternative embodiments are contemplated in which one or more wheels of the wheeled adapter are multidirectional wheels, i.e. wheels capable of imparting rolling mobility to the container in multiple directions and not just a longitudinal direction as shown in the present drawings. For instance, the one or more multidirectional wheels can include one or more swivel casters, spherical wheels, or the like.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A wheel adapter for lifting a cargo container and providing rolling mobility to the cargo container, the wheel adapter comprising:
    an adapter body;
    a container connector, wherein a front end of the container connector extends outward and frontward from the adapter body, wherein the container connector further comprises a container coupling bolt configured for connection to an ISO connector of a cargo container, and a rear end of the container connector is pivotably connected to the adapter body;
a container elevation bolt threadably engaging the adapter body and comprising a bolt head for the application of a torque on the bolt head to rotate the container elevation bolt, wherein the container elevation bolt abuts against the container connector causing the container connector to pivot relative to the adapter body;
a wheel support, carried by the adapter body; and
at least one wheel, coupled to the wheel support and rotatable relative to the adapter body; wherein
the container connector is pivotable relative to the adapter body about a pivot axis located longitudinally between the container elevation bolt and the wheel support; and further wherein
the wheel adapter is configured to selectively and reversibly adopt the following positions by applying a torque on the bolt head:
a first position, in which the container elevation bolt is threaded away from the container connector, and the wheel support is at a first vertical position relative to the container connector, and
a second position, in which the container elevation bolt is threaded towards the container connector and pushes the container connector downward, and the wheel support is at a second vertical position relative to the container connector which is lower than the first vertical position.

2. The wheel adapter of claim 1, wherein the wheel support comprises a wheel axle.

3. The wheel adapter of claim 1, wherein the adapter body comprises a pair of elongated, parallel, spaced-apart side plates arranged in a front-to-back-longitudinal direction of the adapter body.

4. The wheel adapter of claim 3, wherein the at least one wheel is arranged between the side plates.

5. The wheel adapter of claim 3, wherein the adapter body comprises a connecting plate extending between the side plates at a front end of the adapter body, wherein the container elevation bolt is threadably engaged with and extends through the connecting plate.

6. The wheel adapter of claim 3, wherein the wheel support comprises a wheel axle extending from one side plate to the other side plate along a left-to-right, transverse direction of the adapter body.

7. The wheel adapter of claim 3, wherein the container connector is pivotably mounted to the side plates of the adapter body.

8. A wheel adapter for lifting a cargo container and providing rolling mobility to the cargo container, the wheel adapter comprising:
an adapter body;
a container connector, wherein a front end of the container connector extends outward and frontward from the adapter body, wherein the container connector further comprises a container coupling bolt configured for connection to an ISO connector of a cargo container, and a rear end of the container connector is pivotably connected to the adapter body;
a container elevation bolt threadably engaging the adapter body and comprising a bolt head for the application of a torque on the bolt head to rotate the container elevation bolt, wherein the container elevation bolt abuts against the container connector causing the container connector to pivot relative to the adapter body;
a wheel support, carried by the adapter body; and
at least one wheel, coupled to the wheel support and rotatable relative to the adapter body;
wherein the wheel adapter is configured to selectively and reversibly adopt the following positions by applying a torque on the bolt head:
a first position, in which the container elevation bolt is threaded away from the container connector, and the wheel support is at a first vertical position relative to the container connector, and
a second position, in which the container elevation bolt is threaded towards the container connector and pushes the container connector downward, and the wheel support is at a second vertical position relative to the container connector which is lower than the first vertical position.

9. The wheel adapter of claim 8, wherein the wheel support comprises a wheel axle.

10. The wheel adapter of claim 8, wherein the adapter body comprises a pair of elongated, parallel, spaced-apart side plates arranged in a front-to-back-longitudinal direction of the adapter body.

11. The wheel adapter of claim 10, wherein the at least one wheel is arranged between the side plates.

12. The wheel adapter of claim 10, wherein the adapter body comprises a connecting plate extending between the side plates at a front end of the adapter body, wherein the container elevation bolt is threadably engaged with and extends through the connecting plate.

13. The wheel adapter of claim 10, wherein the wheel support comprises a wheel axle extending from one side plate to the other side plate along a left-to-right, transverse direction of the adapter body.

14. The wheel adapter of claim 10, wherein the container connector is pivotably mounted to the side plates of the adapter body.

* * * * *